(12) United States Patent
Darling et al.

(10) Patent No.: US 10,954,100 B2
(45) Date of Patent: Mar. 23, 2021

(54) LITHIUM-ION BATTERY CHARGING SYSTEM FOR A BATTERY POWERED ELEVATOR SYSTEM

(71) Applicant: Otis Elevator Company, Farmington, CT (US)

(72) Inventors: Robert Mason Darling, South Windsor, CT (US); Andrew Smeltz, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 603 days.

(21) Appl. No.: 15/741,022

(22) PCT Filed: Jun. 29, 2016

(86) PCT No.: PCT/US2016/040038
§ 371 (c)(1),
(2) Date: Dec. 29, 2017

(87) PCT Pub. No.: WO2017/004166
PCT Pub. Date: Jan. 5, 2017

(65) Prior Publication Data
US 2018/0194592 A1 Jul. 12, 2018

Related U.S. Application Data

(60) Provisional application No. 62/187,423, filed on Jul. 1, 2015.

(51) Int. Cl.
*B66B 1/34* (2006.01)
*B66B 1/30* (2006.01)
(Continued)

(52) U.S. Cl.
CPC ............... *B66B 1/34* (2013.01); *B66B 1/302* (2013.01); *B66B 9/00* (2013.01);
(Continued)

(58) Field of Classification Search
CPC ... B66B 1/34; B66B 1/302; B66B 9/00; H02J 7/007192; H02J 7/0047; H02J 7/0021;
(Continued)

(56) References Cited

U.S. PATENT DOCUMENTS

| 5,623,195 A | 4/1997 | Bullock et al. |
| 5,945,812 A | 8/1999 | Choi |

(Continued)

FOREIGN PATENT DOCUMENTS

| CN | 1311146 A | 9/2001 |
| CN | 1185156 C | 1/2005 |

(Continued)

OTHER PUBLICATIONS

Chinese First Office Action for application 201680038820.7, dated Jun. 12, 2019, 8 pages.

(Continued)

*Primary Examiner* — Jeffrey Donels
(74) *Attorney, Agent, or Firm* — Cantor Colburn LLP

(57) ABSTRACT

An elevator system includes at least one lithium-ion battery, a temperature sensor (56, 57) operatively coupled to the at least one lithium-ion battery (44), and a lithium-ion battery charging system (50) including a controller (30) having a central processing unit (CPU) (36) interconnected functionally via a system bus to the at least one lithium-ion battery (44) and the temperature sensor (56, 57). The controller (30) further includes at least one memory (38) device thereupon stored a set of instructions which, when executed by the CPU, causes the lithium-ion battery charging system (50) to determine an expected run mode for the elevator system, sense a temperature of the lithium-ion battery (44) through the temperature sensor (56, 57) establishing a sensed temperature, and establish a state of charge (SOC) for the (Continued)

lithium-ion battery based on the sensed temperature and expected run mode of the elevator system.

11 Claims, 2 Drawing Sheets

(51) Int. Cl.
    *H02J 7/00*     (2006.01)
    *B66B 9/00*     (2006.01)
    *H01M 10/0525*     (2010.01)
    *H01M 10/42*     (2006.01)
    *H01M 10/44*     (2006.01)
    *H01M 10/48*     (2006.01)

(52) U.S. Cl.
    CPC ... *H01M 10/0525* (2013.01); *H01M 10/4257* (2013.01); *H01M 10/443* (2013.01); *H01M 10/486* (2013.01); *H02J 7/007* (2013.01); *H02J 7/0021* (2013.01); *H02J 7/0047* (2013.01); *H02J 7/007192* (2020.01); *H01M 2010/4271* (2013.01); *H01M 2220/20* (2013.01); *H02J 7/0048* (2020.01)

(58) Field of Classification Search
    CPC .... H02J 7/007; H02J 7/0048; H02J 7/007194; H01M 10/0525; H01M 10/4257; H01M 10/443; H01M 10/486; H01M 2010/4271; H01M 2220/20
    See application file for complete search history.

(56) References Cited

U.S. PATENT DOCUMENTS

| | | | |
|---|---|---|---|
| 6,016,048 | A | 1/2000 | Davidson |
| 6,454,053 | B2 | 9/2002 | Tominaga et al. |
| 7,227,336 | B1 | 6/2007 | Van Schalkwijk et al. |
| 7,248,023 | B2 | 7/2007 | Takezawa et al. |
| 8,040,106 | B2 | 10/2011 | Ishikawa |
| 8,220,590 | B2 | 7/2012 | Chen et al. |
| 8,779,728 | B2 | 7/2014 | Zhou |
| 8,901,892 | B2 | 12/2014 | Yazami et al. |
| 8,907,631 | B1 | 12/2014 | Gurries et al. |
| 8,941,356 | B2 | 1/2015 | Xu et al. |
| 2001/0011618 | A1 | 8/2001 | Tajima et al. |
| 2001/0017236 | A1 | 8/2001 | Tominaga et al. |
| 2006/0238165 | A1 | 10/2006 | Moore et al. |
| 2011/0226559 | A1* | 9/2011 | Chen ................ G01R 35/005 187/290 |
| 2014/0197778 | A1 | 7/2014 | Kim |
| 2019/0148963 | A1* | 5/2019 | Nakao ................ H02J 7/0014 320/134 |

FOREIGN PATENT DOCUMENTS

| | | |
|---|---|---|
| CN | 101685971 A | 3/2010 |
| CN | 102064362 A | 5/2011 |
| CN | 102143902 B | 8/2011 |
| EP | 1149726 A2 | 10/2001 |
| JP | S60160570 A | 8/1985 |
| JP | 2013052866 A | 3/2013 |
| WO | 2010027346 A1 | 3/2010 |

OTHER PUBLICATIONS

International Search Report and Written Opinion for application PCT/US2016/040038, dated Nov. 3, 2016, 12 pages.

* cited by examiner

LITHIUM-ION BATTERY CHARGING SYSTEM FOR A BATTERY POWERED ELEVATOR SYSTEM

BACKGROUND

Exemplary embodiments pertain to the art of elevator systems and, more particularly, to a lithium-ion battery charging system for a battery powered elevator system.

In a given elevator system or environment, one or more sources may be used to provide power. For example, an elevator may be powered by a battery (battery powered elevator system) or may be powered by an external source of electricity coupled with battery power (hybrid elevator power system). In either case, the elevator system includes a battery that provides all or a portion of electrical power for moving an elevator car along a hoistway. Currently, the battery employed in elevator systems typically takes the form of a lead acid battery.

BRIEF DESCRIPTION

Disclosed is an elevator system including at least one lithium-ion battery, a temperature sensor operatively coupled to the at least one lithium-ion battery, and a lithium-ion battery charging system including a controller having a central processing unit (CPU) interconnected functionally via a system bus to the at least one lithium-ion battery and the temperature sensor. The controller further including at least one memory device thereupon stored a set of instructions which, when executed by the CPU, causes the lithium-ion battery charging system to determine an expected run mode for the elevator system, sense a temperature of the lithium-ion battery through the temperature sensor establishing a sensed temperature, and establish a state of charge (SOC) for the lithium-ion battery based on the sensed temperature and expected run mode of the elevator system.

In addition to one or more of the features described above or below, or as an alternative, further embodiments could include wherein the set of instructions which, when executed by the CPU, causes the lithium-ion battery charging system to raise the temperature of the lithium-ion battery to a predetermined temperature level if the sensed temperature is below a desired temperature.

In addition to one or more of the features described above or below, or as an alternative, further embodiments could include wherein the set of instructions which, when executed by the CPU, causes the lithium-ion battery charging system to activate a heater to raise the temperature of the lithium-ion battery to the desired temperature.

In addition to one or more of the features described above or below, or as an alternative, further embodiments could include wherein the set of instructions which, when executed by the CPU, causes the lithium-ion battery charging system to establish a charging profile to raise the temperature of the lithium-ion battery to the desired temperature.

In addition to one or more of the features described above or below, or as an alternative, further embodiments could include wherein determining the expected run mode for the elevator system includes identifying one of an up-peak operating mode, a down-peak operating mode, and an off-peak operating mode.

Also disclosed is a method of charging a lithium-ion battery for an elevator system including determining an expected run mode for the elevator system, sensing a temperature of the lithium-ion battery through the temperature sensor establishing a sensed temperature, and establishing a state of charge (SOC) for the lithium-ion battery based on the sensed temperature and expected run mode of the elevator system.

In addition to one or more of the features described above or below, or as an alternative, further embodiments could include raising the temperature of the lithium-ion battery to a predetermined temperature level if the sensed temperature is below a desired temperature.

In addition to one or more of the features described above or below, or as an alternative, further embodiments could include wherein raising the temperature includes activating a heater operatively connected to the lithium-ion battery.

In addition to one or more of the features described above or below, or as an alternative, further embodiments could include wherein raising the temperature includes establishing a charging profile for the lithium-ion battery.

In addition to one or more of the features described above or below, or as an alternative, further embodiments could include wherein determining the expected run mode for the elevator system includes identifying one of an up-peak operating mode, a down-peak operating mode, and an off-peak operating mode.

Further disclosed is a battery operated elevator system including an elevator car, a motor drive system operatively connected to the elevator car, a lithium-ion battery operatively coupled to the motor drive system, a temperature sensor operatively coupled to the lithium-ion battery, and a controller operatively connected to the lithium-ion battery. The controller establishes a state of charge (SOC) for the lithium-ion battery based on a temperature sensed by the temperature sensor and an expected run mode of the elevator system.

In addition to one or more of the features described above or below, or as an alternative, further embodiments could include a heater operatively coupled to the controller and the lithium-ion battery for selectively raising a temperature of the lithium-ion battery.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
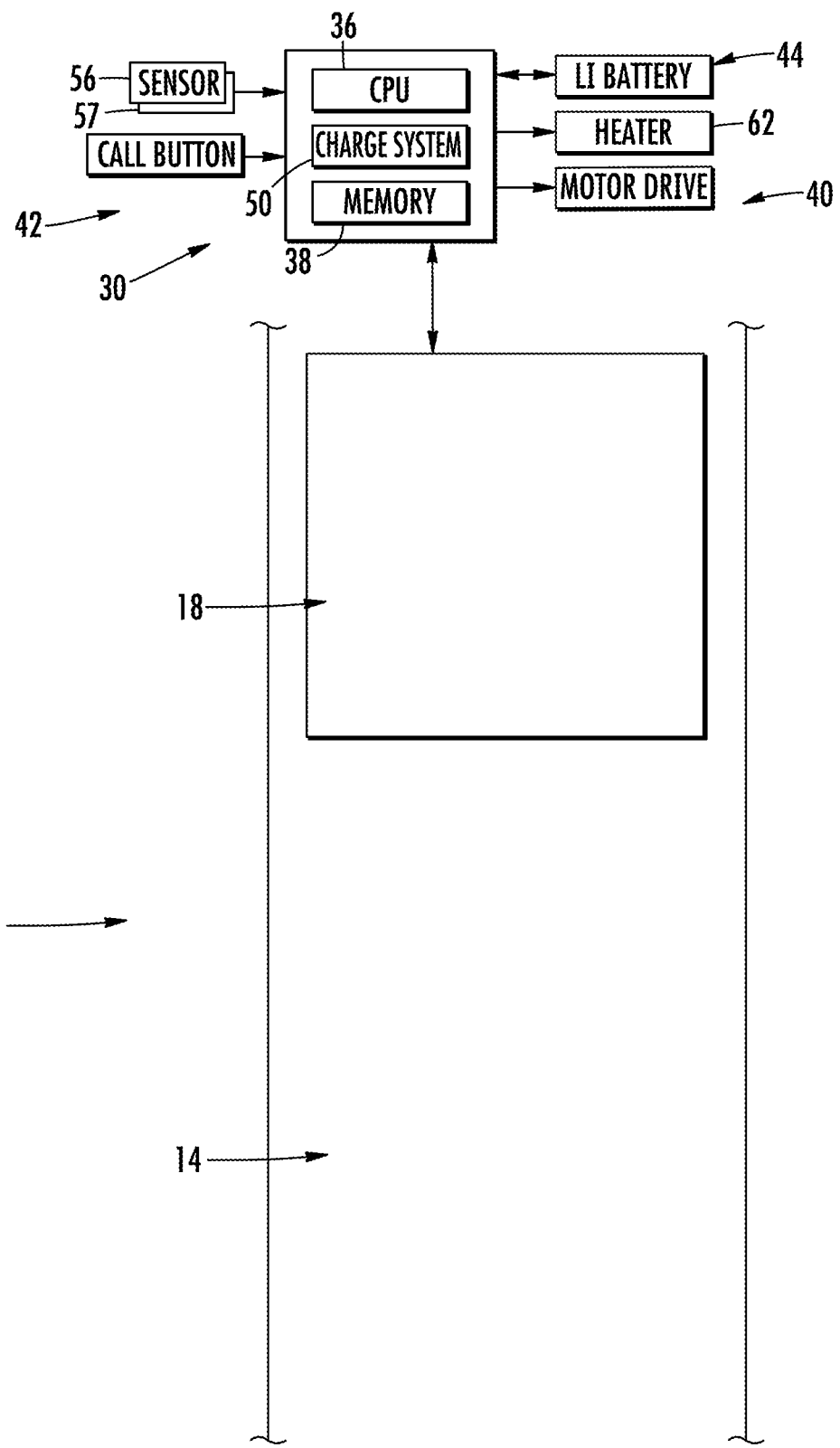
FIG. 1 is schematic view of an elevator system including a lithium-ion battery and a lithium-ion battery charging system in accordance with an exemplary embodiment.

An elevator system, in accordance with an exemplary embodiment, is indicated generally at 10, in FIG. 1. Elevator system 10 includes a hoistway 14 within which transitions an elevator car 18. Elevator car 18 may be moved through a rope/cable system (not shown) or through a ropeless system (also not shown) along hoistway 14. Elevator system 10 also includes a controller 30 that controls movement of elevator car 18 in hoistway 14. Controller 30 includes a central processing unit (CPU) 36 and a memory 38.

Controller 30 may be configured to determine operating mode trends which may be stored in memory 38. Alternatively, pre-programmed operating modes may be input and stored in memory 38. Operating modes may include an up-peak mode, during which elevator calls predominantly request the elevator car 18 to travel upwards to a desired floor, a down-peak mode, during which elevator calls predominantly request the elevator car 18 to travel downward, and an off-peak mode during which the controller 30 may receive a random mix of up and down call requests. Of course, it should be understood that additional operating modes might exist in different installations and should not be considered to be limited to the above listed operating modes.

Controller 30 activates a motor drive system 40 to shift elevator car 18 in response to calls received through, for example, one or more call button stations 42. Call button stations 42 may be arranged at each floor and within each elevator car 18. Motor drive system 40 may receive power from a lithium-ion battery 44 in accordance with an aspect of an exemplary embodiment. Lithium-ion battery 44 may provide all (battery operated elevator system) or a portion (hybrid elevator system) necessary for powering motor drive system 40.

In accordance with an aspect of an exemplary embodiment, elevator system 10 includes a lithium-ion battery charging system 50 operatively and continuously connected to lithium-ion battery 44. At this point, it should be understood that while shown as part of controller 30, lithium-ion charging system 50 may be arranged remotely and simply be electrically connected to controller 30 and lithium-ion battery 44. It should further be understood that the phrase "charging system" describes a system that changes a state of charge (SOC) for lithium-ion battery 44 and may include both increasing the SOC (commonly referred to as charging) and decreasing the SOC (commonly referred to as discharging) as situations and conditions warrant. As will be detailed more fully below, lithium-ion battery charging system 50 establishes the SOC of lithium-ion battery 44 based on a variety of battery conditions including, for example, battery temperature, ambient temperature, and operating mode. Of course, it should be understood that the SOC of lithium-ion battery 44 may be based in whole or in part on other battery conditions not described above. Battery temperature and ambient temperature may be detected by one or more sensors 56 and 57 operatively connected to controller 30. Further, controller 30 may be operatively connected to a heater 62 arranged to heat lithium-ion battery 44 to a desired temperature.

Figure 2:
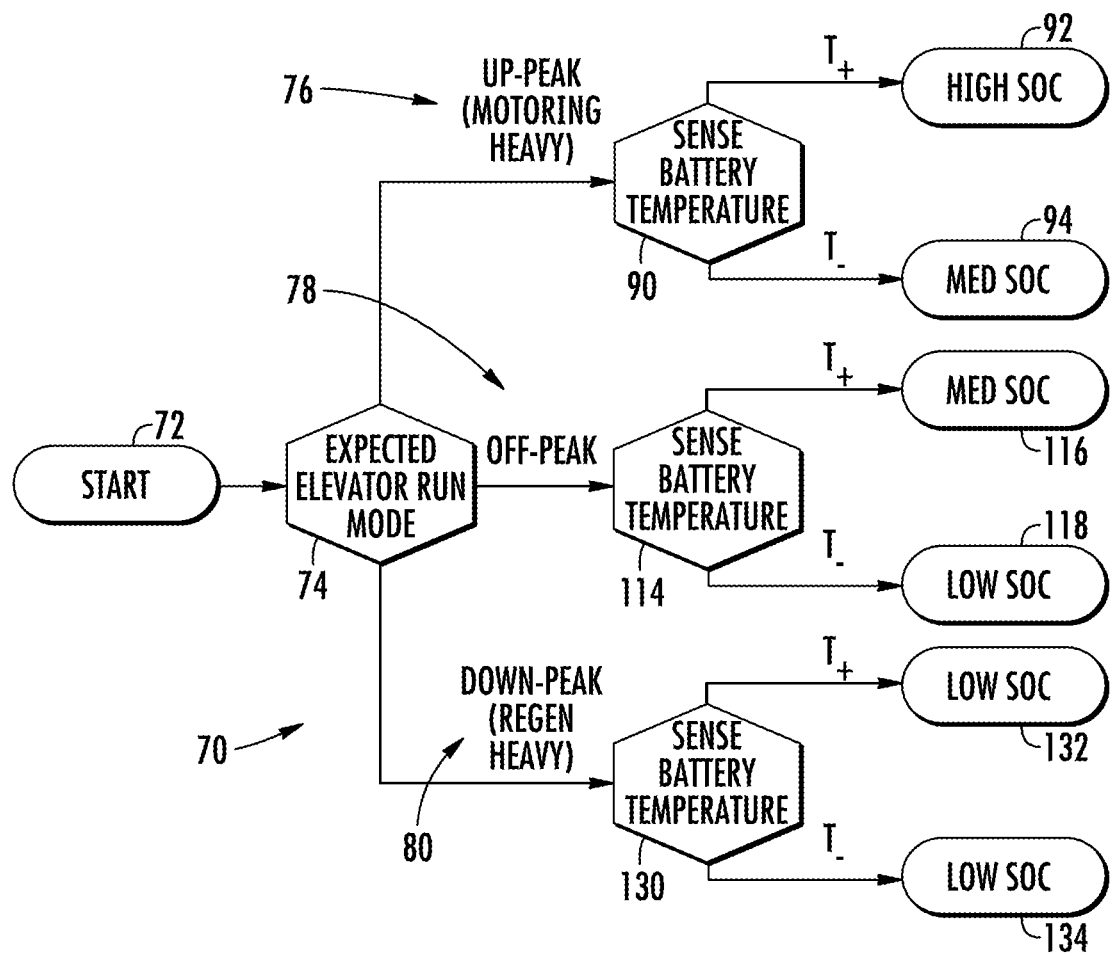
FIG. 2 is a flow chart depicting a method of charging the lithium-ion battery of FIG. 1, in accordance with an aspect of an exemplary embodiment.

Reference will now follow to FIG. 2 in describing a method 70 of charging lithium-ion battery 44 through lithium-ion battery charging system 50. Upon initiating, in block 72, lithium-ion battery charging system 50 determines an expected operating mode cycle in block 74. The "expected operating mode cycle" should be understood to be a subsequent operating mode requiring power from (or returning power to) lithium-ion battery 44. The subsequent operating mode may be based on time of day, day of week, known holidays or combinations thereof. In the exemplary embodiment shown, lithium-ion battery charging system 50 may determine one of an up-peak operating mode at 76, an off-peak operating mode at 78, and a down-peak operating mode at 80. Of course, it should be understood that lithium-ion battery charging system 50 may determine more or fewer operating modes depending upon a particular installation.

When up-peak operating mode 76 is anticipated, lithium-ion battery charging system 50 senses a temperature of lithium-ion battery 44 through sensor 56 in block 90. Lithium-ion battery charging system 50 may also detect ambient temperature through sensor 57. If the sensed temperature is above a desired temperature, or if a sensed temperature difference (battery/ambient) is above a desired temperature difference, lithium-ion battery charging system 50 sets a high SOC for lithium-ion battery 44 in block 92. A high state of charge could represent a SOC that is at or near a voltage rating for lithium-ion battery 44. If the sensed temperature is below the desired temperature, or if the sensed temperature difference is below the desired temperature difference, lithium-ion battery charging system 50 sets a medium SOC for lithium-ion battery 44 in block 94. The medium SOC may represent a median voltage value between a rated discharge voltage and the voltage rating for lithium-ion battery 44.

When off-peak operating mode 78 is anticipated, lithium-ion battery charging system 50 senses a temperature of lithium-ion battery 44 through sensor 56 in block 114. Lithium-ion battery charging system 50 may also detect ambient temperature through sensor 57. If the sensed temperature is above a desired temperature, or if a sensed temperature difference is above a desire temperature difference, lithium-ion battery charging system 50 sets a medium SOC for lithium-ion battery 44 in block 116. If the sensed temperature is below the desired temperature, or if the sensed temperature difference is below the desired temperature difference, lithium-ion battery charging system 50 sets a low SOC for lithium-ion battery 44 in block 118. The low SOC may represent a value at or near to a rated discharge voltage for lithium-ion battery 44.

When down-peak operating mode 80 is anticipated, lithium-ion battery charging system 50 senses a temperature of lithium-ion battery 44 through sensor 56 in block 130. Lithium-ion battery charging system 50 may also detect ambient temperature through sensor 57. If the sensed temperature is above a desired temperature, or if a sensed temperature difference is above a desire temperature difference, lithium-ion battery charging system 50 sets a first low SOC for lithium-ion battery 44 in block 132. If the sensed temperature is below the desired temperature, or if the sensed temperature difference is below the desired temperature difference, lithium-ion battery charging system 50 sets a second low SOC for lithium-ion battery 44 in block 134. The first and second low SOCs may be substantially similar, or represent different voltage values at or near a rated discharge voltage for lithium-ion battery 44.

At this point, it should be understood that the exemplary embodiments describe a system for charging lithium-ion batteries employed to deliver power to an elevator system. The lithium-ion battery charging system establishes a desired SOC of the lithium-ion battery in advance of an expected operating mode. In an up-peak mode, in which heavy motor loads are expected, a high or medium state of charge is established. In a down-peak mode during which heavy regeneration loads are expected, a low SOC is established, and in an off-peak mode during which upward travel and downward travel may be more random, a medium SOC may be established.

Further, lithium-ion battery charging system may raise a temperature of the lithium-ion battery in order to effect better charging, e.g., an affinity to accept a charge or to facilitate rapid charging under colder temperature conditions. The lithium-ion battery may be heated through an associated heater, or by affecting a charge rate of the battery. Finally, by adjusting battery temperature and SOC prior to operation, the lithium-ion battery charging system eliminates, or at least substantially reduces any likelihood that lithium plating will occur which could have a negative effect on battery performance.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system comprising:
   at least one lithium-ion battery;
   a temperature sensor operatively coupled to the at least one lithium-ion battery; and
   a lithium-ion battery charging system including a controller including a central processing unit (CPU) interconnected functionally via a system bus to the at least one lithium-ion battery and the temperature sensor, and at least one memory device thereupon stored a set of instructions which, when executed by the CPU, causes the lithium-ion battery charging system to:
   determine an expected run mode for the elevator system;
   sense a temperature of the lithium-ion battery through the temperature sensor establishing a sensed temperature; and
   establish a state of charge (SOC) for the lithium-ion battery based on the sensed temperature and expected run mode of the elevator system;
   wherein determining the expected run mode for the elevator system includes identifying one of an up-peak operating mode, a down-peak operating mode, and an off-peak operating mode;
   wherein establishing the state of charge (SOC) for the lithium-ion battery based on the sensed temperature and expected run mode of the elevator system comprises selecting at least one of a first SOC, a second SOC and a third SOC for the lithium-ion battery based on the sensed temperature and expected run mode.

2. The elevator system according to claim 1, wherein the set of instructions which, when executed by the CPU, causes the lithium-ion battery charging system to raise the temperature of the lithium-ion battery to a predetermined temperature level if the sensed temperature is below a desired temperature.

3. The elevator system according to claim 2, wherein the set of instructions which, when executed by the CPU, causes the lithium-ion battery charging system to activate a heater to raise the temperature of the lithium-ion battery to the desired temperature.

4. The elevator system according to claim 2, wherein the set of instructions which, when executed by the CPU, causes the lithium-ion battery charging system to establish a charging profile to raise the temperature of the lithium-ion battery to the desired temperature.

5. A method of charging a lithium-ion battery for an elevator system comprising:
   determining an expected run mode for the elevator system;
   sensing a temperature of the lithium-ion battery through the temperature sensor establishing a sensed temperature; and
   establishing a state of charge (SOC) for the lithium-ion battery based on the sensed temperature and expected run mode of the elevator system;
   wherein determining the expected run mode for the elevator system includes identifying one of an up-peak operating mode, a down-peak operating mode, and an off-peak operating mode;
   wherein establishing the state of charge (SOC) for the lithium-ion battery based on the sensed temperature and expected run mode of the elevator system comprises selecting at least one of a first SOC, a second SOC and a third SOC for the lithium-ion battery based on the sensed temperature and expected run mode.

6. The method of claim 5, further comprising: raising the temperature of the lithium-ion battery to a predetermined temperature level if the sensed temperature is below a desired temperature.

7. The method of claim 6, wherein raising the temperature includes activating a heater operatively connected to the lithium-ion battery.

8. The method of claim 6, wherein raising the temperature includes establishing a charging profile for the lithium-ion battery.

9. A battery operated elevator system comprising:
   an elevator car;
   a motor drive system operatively connected to the elevator car;
   a lithium-ion battery operatively coupled to the motor drive system;
   a temperature sensor operatively coupled to the lithium-ion battery; and
   a controller operatively connected to the lithium-ion battery, the controller establishing a state of charge (SOC) for the lithium-ion battery based on a temperature sensed by the temperature sensor and an expected run mode of the elevator system;
   wherein determining the expected run mode for the elevator system includes identifying one of an up-peak operating mode, a down-peak operating mode, and an off-peak operating mode;
   wherein establishing the state of charge (SOC) for the lithium-ion battery based on the sensed temperature and expected run mode of the elevator system comprises selecting at least one of a first SOC, a second SOC and a third SOC for the lithium-ion battery based on the sensed temperature and expected run mode.

10. The battery operated elevator system according to claim 9, further comprising: a heater operatively coupled to the controller and the lithium-ion battery for selectively raising a temperature of the lithium-ion battery.

11. An elevator system comprising:
at least one lithium-ion battery;
a temperature sensor operatively coupled to the at least one lithium-ion battery; and
a lithium-ion battery charging system including a controller including a central processing unit (CPU) interconnected functionally via a system bus to the at least one lithium-ion battery and the temperature sensor, and at least one memory device thereupon stored a set of instructions which, when executed by the CPU, causes the lithium-ion battery charging system to:
determine an expected run mode for the elevator system and establish a state of charge (SOC) for the lithium-ion battery with respect to the expected run mode of the elevator system;
wherein determining the expected run mode for the elevator system includes identifying one of an up-peak operating mode, a down-peak operating mode, and an off-peak operating mode; and
wherein the set of instructions, when executed by the CPU, further causes the lithium-ion battery charging system to:
sense a temperature of the lithium-ion battery or a temperature difference of the lithium-ion battery with respect to ambient temperature through the temperature sensor establishing a sensed temperature or temperature difference; and
establish the state of charge (SOC) for the lithium-ion battery with respect to the expected run mode of the elevator system based on the sensed temperature;
wherein with respect to the up-peak operation mode a high state of charge (SOC) is set for the lithium-ion battery in case the sensed temperature or temperature difference is above a desired temperature or temperature difference, and a medium state of charge (SOC) is set for the lithium-ion battery in case the sensed temperature or temperature difference is below the desired temperature or temperature difference;
wherein with respect to the off-peak operation mode a medium state of charge (SOC) is set for the lithium-ion battery in case the sensed temperature or temperature difference is above a desired temperature or temperature difference, and a low state of charge (SOC) is set for the lithium-ion battery in case the sensed temperature or temperature difference is below the desired temperature or temperature difference; and
wherein with respect to the down-peak operation mode a first low state of charge (SOC) is set for the lithium-ion battery in case the sensed temperature or temperature difference is above a desired temperature or temperature difference, and a second low state of charge (SOC) is set for the lithium-ion battery in case the sensed temperature or temperature difference is below the desired temperature or temperature difference.

* * * * *